(12) United States Patent
Risla

(10) Patent No.: US 9,909,674 B2
(45) Date of Patent: Mar. 6, 2018

(54) PULSE-WIDTH-REGULATING VALVE

(71) Applicant: Viking Heat Engines AS, Kristiansand (NO)

(72) Inventor: Harald Nes Risla, Lillesand (NO)

(73) Assignee: Viking Heat Engines AS, Kristiansand (NO)

( * ) Notice: Subject to any disclaimer, the term of this patent is extended or adjusted under 35 U.S.C. 154(b) by 130 days.

(21) Appl. No.: 14/420,694

(22) PCT Filed: Aug. 21, 2013

(86) PCT No.: PCT/NO2013/050134
§ 371 (c)(1),
(2) Date: Feb. 10, 2015

(87) PCT Pub. No.: WO2014/031007
PCT Pub. Date: Feb. 27, 2014

(65) Prior Publication Data
US 2015/0219227 A1  Aug. 6, 2015

(30) Foreign Application Priority Data
Aug. 22, 2012 (NO) .................................... 20120939

(51) Int. Cl.
*F16K 15/06* (2006.01)
*F16K 31/52* (2006.01)
(Continued)

(52) U.S. Cl.
CPC .............. *F16K 15/06* (2013.01); *F01L 7/026* (2013.01); *F01L 15/08* (2013.01); *F01L 19/00* (2013.01);
(Continued)

(58) Field of Classification Search
CPC .......... F16K 15/06; F16K 15/18; F16K 35/00; F16K 2820/01; F01L 33/00; F01L 15/08;
(Continued)

(56) References Cited

U.S. PATENT DOCUMENTS 1,212,959 A     1/1917   King
1,650,082 A *  11/1927   Litton ..................... F01L 7/026
                                                                      123/190.1
(Continued)

FOREIGN PATENT DOCUMENTS

DE          1249041         8/1967
GB           215766        12/1924
(Continued)

OTHER PUBLICATIONS

International Search Report and Written Opinion for PCT/NO2013/050134 dated Dec. 19, 2013.
(Continued)

*Primary Examiner* — Jessica Cahill
*Assistant Examiner* — Daphne M Barry
(74) *Attorney, Agent, or Firm* — Andrus Intellectual Property Law, LLP

(57) ABSTRACT

A pulse-width-regulating valve is for the regulation of a fluid flow or a fluid pressure. The pulse-width-regulating valve comprises a cut-off valve connected in series with an inflow valve, at least one of the cut-off valve and the inflow valve being provided with an axially displaceable or rotatable valve element which has an opening position or a closing position at a distance from a starting position of the valve element. A method of operating a pulse-width-regulating valve comprises: regulating a valve gear device by a valve synchronizer, in accordance with at least two displacement
(Continued)

curves; and by one or more valve actuators, displacing or rotating corresponding valve elements arranged in the pulse-width-regulating valve.

20 Claims, 12 Drawing Sheets

(51) Int. Cl.
*F16K 11/22* (2006.01)
*F01L 35/00* (2006.01)
*F16K 15/18* (2006.01)
*F01L 7/02* (2006.01)
*F01L 15/08* (2006.01)
*F01L 19/00* (2006.01)
*F01L 33/00* (2006.01)
*F01L 35/02* (2006.01)
*F16K 31/524* (2006.01)

(52) U.S. Cl.
CPC ............... *F01L 33/00* (2013.01); *F01L 35/00* (2013.01); *F01L 35/02* (2013.01); *F16K 11/22* (2013.01); *F16K 15/18* (2013.01); *F16K 31/52458* (2013.01); *F01L 2820/01* (2013.01); *Y10T 137/0396* (2015.04); *Y10T 137/7846* (2015.04)

(58) Field of Classification Search
CPC ................ F01L 35/02; Y10T 137/7846; Y10T 137/0396
USPC .... 137/613, 614.11, 614.13, 614.14, 614.15, 137/614.2
See application file for complete search history.

(56) References Cited

U.S. PATENT DOCUMENTS

| | | | |
|---|---|---|---|
| 1,670,069 A | | 5/1928 | Helander |
| 2,472,284 A | | 6/1949 | Clark |
| 2,667,129 A | | 1/1954 | Graner |
| 3,509,913 A | * | 5/1970 | Lewis ..................... E21B 34/10 137/614.11 |
| 3,557,828 A | * | 1/1971 | Smith ..................... E21D 23/26 137/596.1 |
| 4,267,765 A | * | 5/1981 | Hedger ................... F01L 15/08 91/186 |
| 6,578,538 B2 | * | 6/2003 | Trentham ................ F01L 7/026 123/190.17 |
| 2006/0243229 A1 | * | 11/2006 | Zajac ...................... F01B 31/14 123/70 R |

FOREIGN PATENT DOCUMENTS

| | | |
|---|---|---|
| GB | 235226 | 8/1925 |
| GB | 303012 | 4/1929 |
| GB | 530478 | 12/1940 |
| JP | S5831504 | 12/1979 |
| WO | 2002/04790 | 1/2002 |

OTHER PUBLICATIONS

International Preliminary Report on Patentability for PCT/NO2013/050134 dated Jul. 7, 2014.
Jakuba, Stanislav et al., "Component Development of Automotive Reciprocating Steam Expanders", Society of Automotive Engineers, Inc., Feb. 24-28, 1975, 750068: 1-15.
Syniuta, W.D., "Design Features and Initial Performance Data on an Automotive Steam Engine Part II—Reciprocating Steam Expander—Design Features and Performance", Society of Automotive Engineers, Inc., Feb. 25-Mar. 1, 1974, 740296: 1-18.

* cited by examiner

PULSE-WIDTH-REGULATING VALVE

CROSS-REFERENCE TO RELATED APPLICATIONS

This application is the U.S. national stage application of International Application PCT/NO2013/050134, filed Aug. 21, 2013, which international application was published on Feb. 27, 2014, as International Publication WO2014/031007 in the English language. The international application is incorporated herein by reference, in entirety. The international application claims priority to Norwegian Patent Application Serial No. 20120939, filed Aug. 22, 2012, which is incorporated herein by reference, in entirety.

FIELD

A pulse-width-regulating valve for the control of a fluid flow and/or a fluid pressure is described. A method of operating the pulse-width-regulating valve is described as well.

BACKGROUND

An analogy to electrical pulse-width modulation exists in terms of fluid flow, wherein one or more valves control(s) a fluid flow in a cyclic manner, the valve or valves being operated in such a way that the lowest possible pressure drop is achieved when it/they is/are in the open position. Ideally, valves used in pulse-width modulation have just two states; that is to say either fully open (on) or fully closed (off). This is also in accordance with electrical pulse-width modulation, in which electrical switches, generally in the form of transistors, are fully on or fully off. A variable flow is achieved by the relationship between the opening time and the closing time being varied, but the frequency, as a rule, being kept constant. The relationship between the time in the open state and the time in the closed state is usually termed the duty cycle, often denoted by the symbol "D", and is given in percent. During cyclic operation at a given operating frequency, the duty cycle is independent thereof and only says something about the relationships mentioned between the off/on intervals. The fluid flow achieved will then, in the main, be proportional to the duty cycle of the valve (and, correspondingly, of the switch in an electrical context). At a duty cycle of 0% (D=0%), at which the valve is fully closed, there is no fluid flow. At D=50%, then 50% of the total fluid flow available is achieved, depending on the remaining resistance and the supply pressure in the circuit, et cetera.

FIG. 1 shows a function diagram for a pulse-width-modulated circuit with different duty cycles.

For the variable adjustment of a fluid flow, it is also common to use a form of choke/throttle valve. The use of a choke valve entails a relatively large loss when it is partly open. The loss is generally in the form of an isenthalpic pressure drop and accompanying free expansion and/or friction resulting from turbulent flow phenomena arising because of narrow or other fluid-flow-restraining passages in the fluid path, it all depending on the character of the throttling and the fluid. A valve operates with minimal loss only when the valve opening is large and the pressure drop across the valve is small at full fluid throughput. The port openings and a possible valve element slot/opening of a pure off/on-valve are dimensioned according to the expected or necessary fluid flow, so that the valve will exhibit only small losses when fully open, whereas for a proportional valve or other type of valve intended to provide variable fluid flow, there will always be considerable losses at partial flow, that is to say when the position of the valve is in a state between fully open and fully closed.

For smaller applications that require small fluid flows, this is not necessarily a problem. The problem will arise only when high losses in the form of pressure drops arise because of large fluid flows, and, in such cases, it could then be of great advantage to make use of a pulse-width-regulated valve instead, as the valve will then exhibit considerably lower loss according to the explanation above.

For heat engines, and then in particular steam engines and variants thereof, it is common to make use of a form of pulse-width modulation/regulation, and then often defined as cut-off-regulated injection. This form of pulse-width modulation makes the working fluid, often steam, be injected under full pressure into the expansion chamber, often cylinder chamber, of the engine until the chamber has reached a certain volume. The steam supply is then shut off (cut-off), and the steam goes on expanding near-adiabatically until the exhaust valve is opened as the cylinder chamber has reached a nearly full stroke volume. In this way, the steam supply may be regulated without any particular throttling, which would otherwise have entailed substantial losses.

In prior art there are many valve solutions for controlling such a process. In earlier steam engines, the cut-off point, which in turn gives the duty cycle of the supply valve, was regulated by the stroke of a slide valve being adjustable in the moving direction, among other things, and in that way, an adjustable cut-off was achieved. This gave great advantages over engines based on throttle valves, as explained above. Such engines could also, with simplicity, be reversed by a suitable valve gear mechanism being used. An example of a valve gear mechanism that could provide both controllable cut-off adjustment and also reversal is the Stephenson mechanism. This was usually used for steam locomotives, and innumerable other corresponding mechanisms have been made, such as the Walschaerts mechanism, the Corliss mechanism and, more recently, the Caprotti mechanism. Depending on the type, these could control everything from slide valves to partially rotating valves and seat valves with functions for variable cut-off and reversal.

What has nevertheless been a problem in several of them is achieving a fast enough acceleration of the valve elements or possibly sufficiently short opening/closing times when switching states. Because of the specific design solutions, it is often so that the movements of the valves around the switching points (opening/closing) starts from or ends in a standstill; that is to say, in these areas, the valve elements exhibit low speed, with the consequence that they provide a considerable throttling for a period when switching states.

In several valve gear mechanisms, the functioning is often such that there is a considerable throttling of the total opening of the valves when, in a cyclic state of operation, they are near the shutting-off state. This means that even though the valve mechanisms provide a practical approach to pulse-width modulation, the valves actually operate with considerable losses in consequence of the throttling they exhibit when switching between the closed and open states.

In addition, it is difficult to achieve a sufficiently low bottom limit for the duty cycle; that is to say, cut-offs and consequently duty cycles down towards 0% are difficult to achieve, especially without an element of throttling with accompanying loss. In particular, cut-off points adjusted below 5-10%, for example, can be difficult to achieve, which means that steam engines are difficult, partly impossible, to regulate for low power draws.

SUMMARY

The invention has for its object to remedy or reduce at least one of the drawbacks of the prior art or at least provide a useful alternative to the prior art.

The object is achieved through features, which are specified in the description below and in the claims that follow.

A pulse-width-modulating valve consisting of two valve units connected in series, more particularly an inflow valve and a cut-off valve, in which steps have been taken to increase the speed of each valve unit when switching state, in order thereby to solve the main problems in opening and closing the valve of a steam engine and equivalents thereto.

The publications SAE 740296 and SAE 750068 disclose such a solution implemented with seat valves, wherein, in principle, as low cut-off points, that is to say as short opening intervals, as desirable, and down towards 0% can be achieved. The use of seat valves will still exhibit a relatively high throttling near the closed state, which is in the nature of the seat valves, and which is a disadvantage.

By using two valve units connected in series, the switchings of states must necessarily not be fast in both directions (open/closed) for both valve units, because, generally, it will be sufficient for the inflow valve to exhibit fast switching when opening, and for the cut-off valve to exhibit fast switching when closing. In this way, steps can be taken to increase the speed in the switching functions in just one direction while, at the same time, the total function of the valve still exhibits fast switching properties. Having to provide high speed in just one direction has some advantages. For example, in an electrically operated valve, it is common for the valve to exhibit the highest switching speed in just one direction, and then usually in the direction which is controlled by a solenoid, if it as a question of a valve with spring return in a direction opposite to the pull or push force of the solenoid.

Asymmetric speed control of a valve, in which the closing movement is typically much faster than the opening movement, has also been implemented in historic designs: A trip-gear was often used, providing fast shut-off/cut-off by the supply/injection valve. The advantage of this is that throttling is minimized, but often with the drawback of there having been a need for the acceleration of the valve element to be high, with resulting wear problems. Such mechanisms have still functioned satisfactorily at low speeds of operation, for example up towards approximately two hundred rpm. For more fast-rotating engines, there may be a need for even faster mechanisms, and if this is to be performed by a single valve element, for example a slide, the necessary acceleration will get up to a level which is not practical or, at worst, impossible to implement.

FIG. 1 shows generalized function diagrams for a pulse-width-modulated circuit. These may, in principle, apply to both an electrical circuit and a fluid circuit, but in what follows, they are assumed to apply to a fluid circuit. For a fluid circuit with proportional, that is to say linear, regulation of the fluid flow, there will be an analogous relationship between a valve stroke and the resulting momentary fluid flow, so that an analogous breaking up of the fluid flow can be achieved through the valve. FIG. 1 shows an equivalence to this in terms of function, but where the momentary fluid flow has discrete properties, that is to say the fluid flow can only be fully shut off or at its maximum, and where, in principle, intermediate levels do not exist then. Still, by regulating the relationship between the periods of the open and closed states, a mean flow can be achieved that may vary analogously, and in this way a pulse-width-regulated circuit could replace a linearly regulated circuit. It should be mentioned that in a pulse-width-regulated circuit there might be a need to introduce pressure- and flow-equalizing units, such as an accumulator, so that the resulting fluid flow will only exhibit smaller variations, which may be necessary to avoid too great strains on the system in consequence of rapidly varying pressure and flow levels.

In a practically implemented pulse-width-regulated circuit, there will also be a certain rise time and fall time associated with the switching points between the off and on states, because no physical system can exhibit infinitely high acceleration. In practice, the function curve will be more diagonal at the switching points than what is shown in FIG. 1. Such diagonal portions will then introduce some loss, but the net gain in pulse-width-regulated circuits may still be very large in relation to linearly controlled circuits.

FIG. 2 shows schematically how two valve units placed in series may be operated by two camshafts with camshaft profiles that are phase-shifted relative to each other by means of a phase-regulation unit. Alternatively one camshaft with two profiles can be used, wherein the camshaft profiles may be shifted relative to each other on the camshaft by means of a suitable phase-regulation unit. The phase-regulation unit may be formed and regulated in various ways. Conventionally, mechanical principles have often been used for the phase regulation, but, more recently, hydraulic, electrohydraulic and electromechanical regulation principles have become usual as well. The invention can utilize most variants of phase-regulating units and methods and thereby is not dependent on a specific solution for this, and therefore, no further emphasis will be laid on it in the description. Actuators included in said phase-regulating units may also be of different characters. Mechanical, hydraulic as well as electric actuators can be used, which is illustrated further in the FIGS. 2 and 3.

As for the valve unit itself, it is an important point that different valve types exhibit different properties in connection with what kind of opening and closing speeds are achievable. A seat valve, for example, will always have to be accelerated from a standstill; that is to say, the speed is zero as a seat valve element starts an opening sequence, by the very fact of the closed state existing when the seat valve element is in contact with a valve seat and exhibits fluid-tightness. As the seat valve opens, it will, in a first period of the opening sequence, exhibit relatively high flow resistance until the valve is sufficiently open and the pressure drop across the valve decreases. The same applies in the last phase of a closing sequence, in which the seat valve element approaches the valve seat at a decreasing speed which is achieved, for example, by means of valve gear means suitable therefor. A low opening speed and/or closing speed is/are generally a disadvantage where there is a need for a large flow through the valve, because the throttling of the flow channel that occurs in these phases will cause a considerable pressure drop with subsequent loss.

The drawback of such a pressure drop can be limited by introducing a valve type in which the switching speed can be made high. One way is to use valves with gliding port transitions. Examples of valves with gilding port transitions are ball valves, slide valves, piston valves or rotating valves of cylindrical designs and with radial ports, for example. In such valves, the acceleration of the valve element may happen in advance of the transition phase, in which the losses are most decisive. The valve element can then achieve a high speed before reaching its closing or opening phase, and in that way, the duration of the unfavourable transition period can be limited, which also entails a corresponding reduction in possible losses. The result is that the valves are opened and closed substantially faster, and this may apply in both directions, in both opening and closing, that is.

In a heat engine such optimizing for reducing flow losses through valves may have decisive consequence for the total performance of the engine, as it may mean the difference between a profitable and an unprofitable embodiment.

For a device with a controlled two-phase fluid flow (mixture of liquid and gas), in which liquid and gas are to be kept separated, the liquid possibly also to be boiled in an efficient manner, a cyclone connected to a pulse-width regulator may be used, the pulse-width regulator being arranged with a driving-flow port for the controlled outflow (leakage) of a smaller amount of fluid even when the cut-off valve is dosed. This may help to maintain a cyclonic flow within the cyclone even when the main flow is shut off. FIGS. 13 and 14 show this principle with and without a downstream cyclone, respectively. The driving-flow port may either be arranged in the cut-off valve element itself, as a separate channel into an intervalve volume, or as any other passage from a fluid reservoir to the intervalve volume. The driving-flow port will, as a rule, include a throttling for restricting the fluid flow, a driving flow normally being a fraction of the regulated main flow measured in fluid flow rate.

For a heat engine with an internal heat exchanger and working-fluid injection, and especially liquid injection, a pulse-width regulator with a driving-flow port could be particularly favourable, as the driving flow could maintain a considerable convection, even after the main flow has been shut off, which could give a very positive effect on the heat transmission between the internal heat exchanger and the working fluid. FIG. 15 shows an example of such a configuration.

If an operating range up to and including D=100% is to be achieved by the valve function described, two or more valves connected in parallel can be used. Two valves, each exhibiting a duty cycle (D) of up to 50% at a 180° opening interval, could give the desired effect. Individual opening periods may also, with advantage, be reduced from 180°, and in one example, a cut-off valve may have an opening interval different from the opening interval of an inflow valve, so that, for example, any smaller, undesired leaks may be limited.

In a first aspect, the invention relates more specifically to a pulse-width-regulating valve for regulating a fluid flow and/or a fluid pressure, the pulse-width-regulating valve comprising a cut-off valve connected in series with an inflow valve, at least one of the cut-off valve and the inflow valve being provided with an axially movable or rotatable valve element, characterized in that said valve element has an opening position and/or a closing position at a distance from a starting position of the valve element offering gliding port transitions.

At least one of the cut-off valve and the inflow valve may be taken from the group consisting of a shell valve, a slide valve or a fully or partially rotating valve.

The cut-off valve may exhibit an opening speed, which is greater than the closing speed, and the inflow valve may exhibit a closing speed, which is greater than the opening speed.

At least one of the cut-off valve and the inflow valve may be connected to a valve-gear device.

The valve-gear device may be formed by means of at least one actuator of at least one type taken from the group consisting of a mechanical valve actuator, hydraulic valve actuator, pneumatic valve actuator, electromechanical valve actuator, electrohydraulic valve actuator and electropneumatic valve actuator.

The valve-gear device may be connected to a valve synchronizer.

The valve synchronizer may be arranged to control the operational phase relationship of the opening and closing movements between the at least two valves.

The pulse-width-regulating valve may include a valve housing provided with at least one inlet port, at least one outlet port and at least one intermediate-passage port, wherein at least two valve elements with respective valve element openings are arranged to open to and shut off, respectively, a fluid flow which has a direction, in terms of fluid flow, from the at least one inlet port via the at least one intermediate-passage port to the at least one outlet port.

The valve housing may be provided with at least one leak port.

At least one of the at least one inlet port, the at least one outlet port and the at least one intermediate-passage port may exhibit an aperture substantially different from at least one valve element aperture, in order thereby to maintain a maximum valve opening over an extended area of the total displacement area of the at least one valve element.

At least one valve element may be formed with at least one leak channel in order thereby to maintain a fluid flow when said valve element is in its starting position.

From first and second end faces of the valve elements, valve stems may project through respective valve seals arranged in the valve housing.

The first and second end faces may form axial-pressure faces of equal size.

The valve elements may be axially preloaded, a preloading element providing a compressive force against the first and second end faces.

In a second aspect, the invention relates, more specifically, to a method of operating a pulse-width-regulating valve according to the first aspect of the invention, characterized by the method comprising the following steps:
regulating a valve-gear device by means of a valve synchronizer, in accordance with at least two displacement curves; and
by means of one or more valve actuators, displacing or rotating corresponding valve elements arranged in the pulse-width-regulating valve.

The method may include the further step of:
continuously regulating a phase relationship between the at least two displacement curves.

In a third aspect, the invention relates, more specifically, to the use of a pulse-width-regulating valve according to the first aspect and/or the second aspect of the invention in a heat engine, a heat pump, a compressor, an expander and a pulse-width-modulated hydraulic or pneumatic circuit.

The heat engine may be arranged in a combined heat and power station.

BRIEF DESCRIPTION OF THE DRAWINGS

In what follows, an example of a preferred embodiment is described, which is visualized in the accompanying drawings, in which:

FIG. 16b shows an axial section through the valve according to FIG. 16a, but in which the valve elements have been rotated 90 degrees in relation to the representation in FIG. 16a.

DETAILED DESCRIPTION OF THE DRAWINGS

Figure 1:
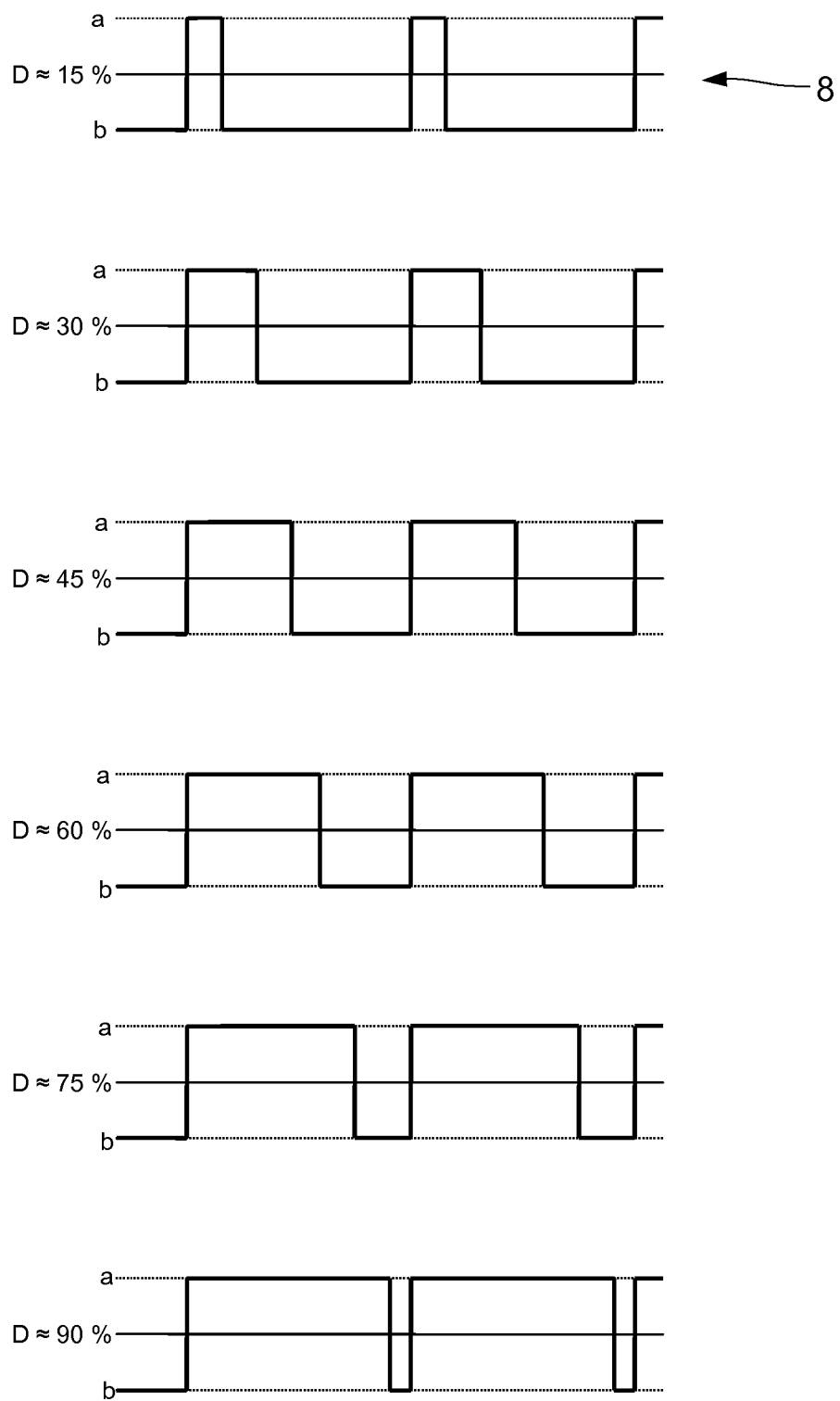
FIG. 1 shows a function diagram for a pulse-width-regulated device, in which the pulse-width period is shown as 15, 30, 45, 60, 75 and 90%, respectively.
Figure 5:
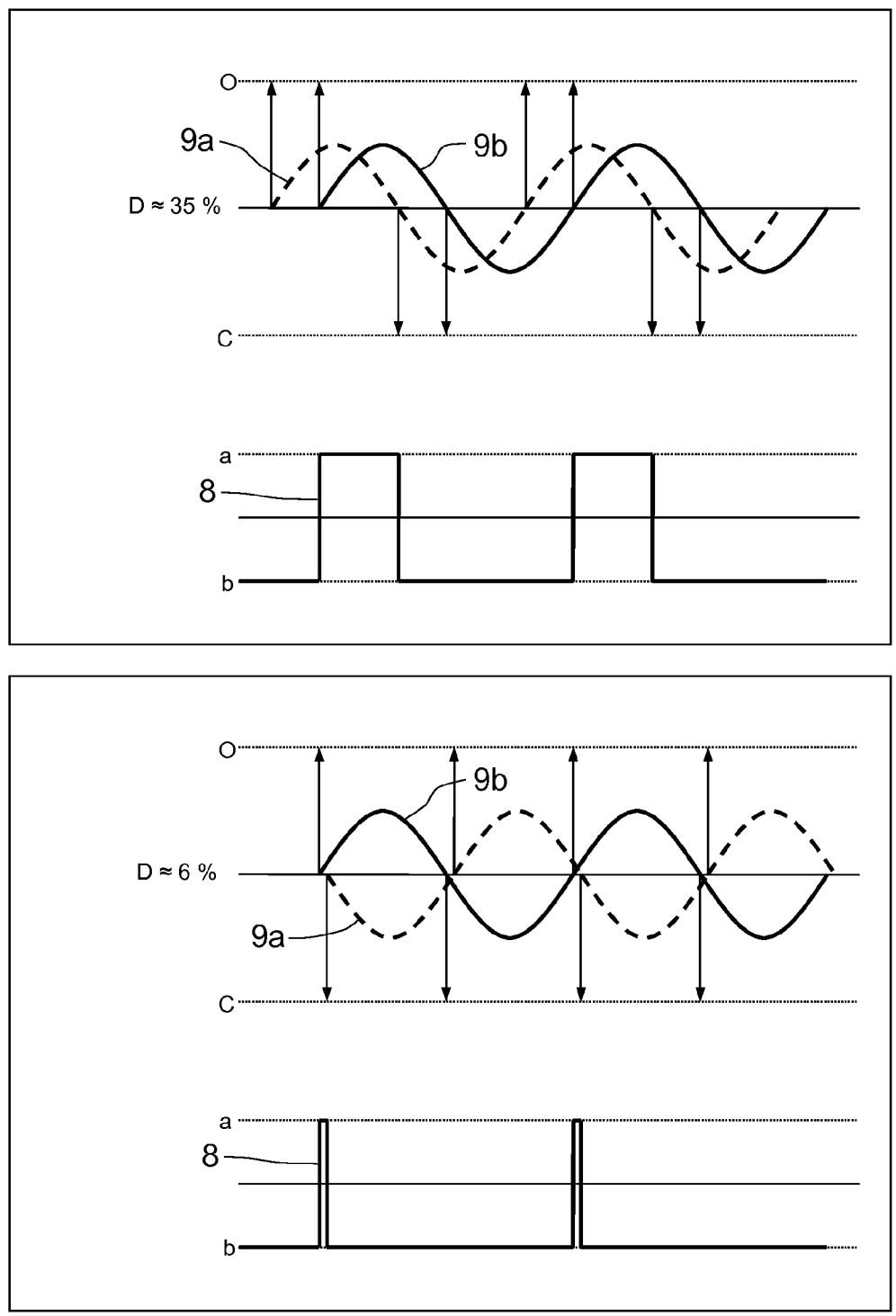
FIG. 5 shows a function diagram for a pulse-width-regulating valve with associated phase-shift curves.
Figure 9:
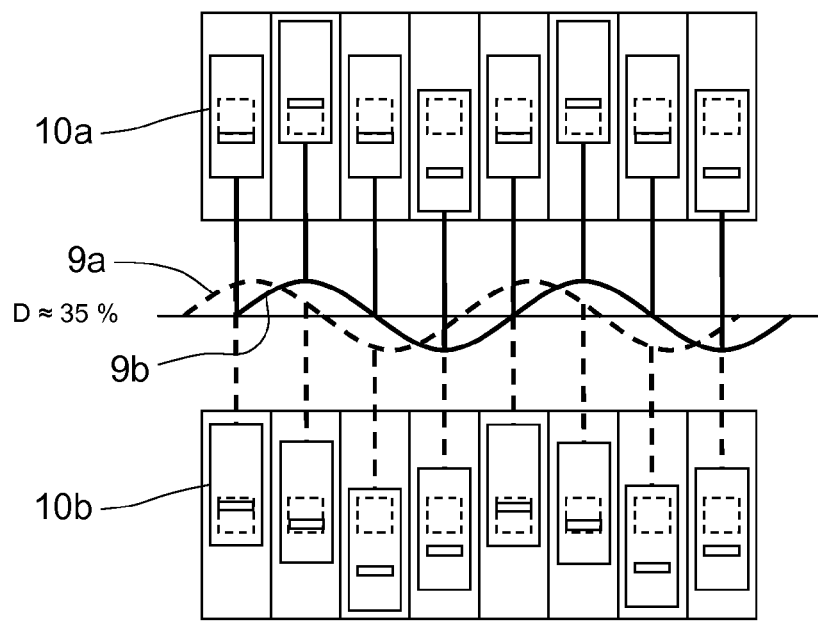
FIG. 9 shows a principle drawing of the function of the pulse-width-regulating valve during the operation over two full cycles.
Figure 9:
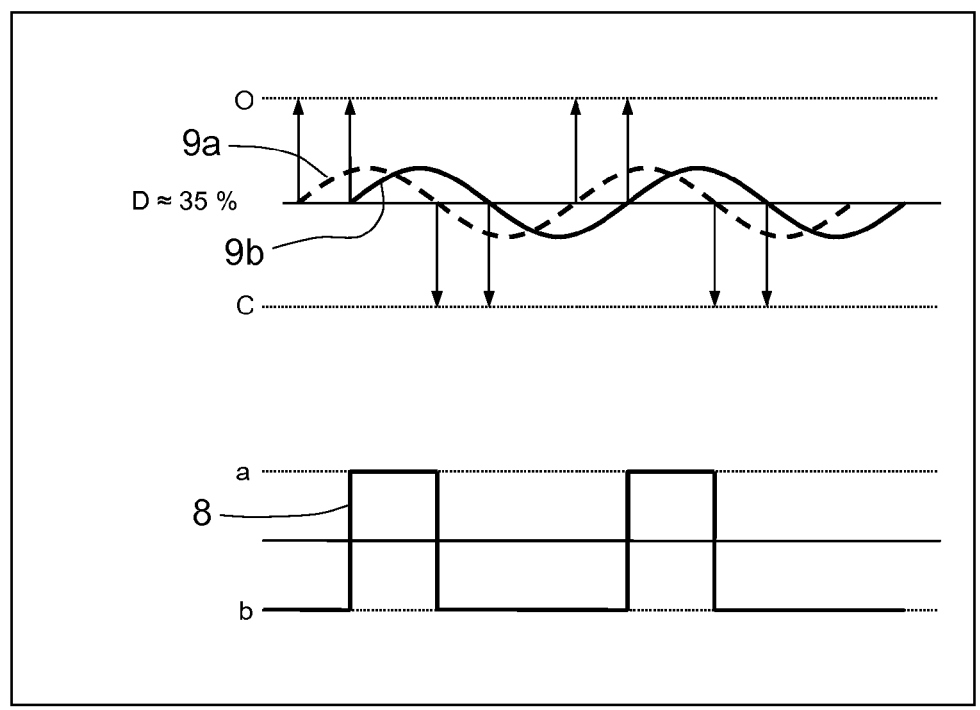

In the function diagrams of FIGS. 1, 5 and 9, the references "a" and "b" indicate, respectively, an open and a closed pulse-width-modulated flow circuit. In the phase-shift curves in FIGS. 5 and 9, the references "O" and "C" indicate, respectively, an open and a closed valve element. "D" indicates the relationship between the time in the open state and the time in the closed state of the valve, also called a duty cycle.

"q", in FIGS. 2, 3, 4, 6, 10 and 11, indicates a fluid flow.

Figure 6:
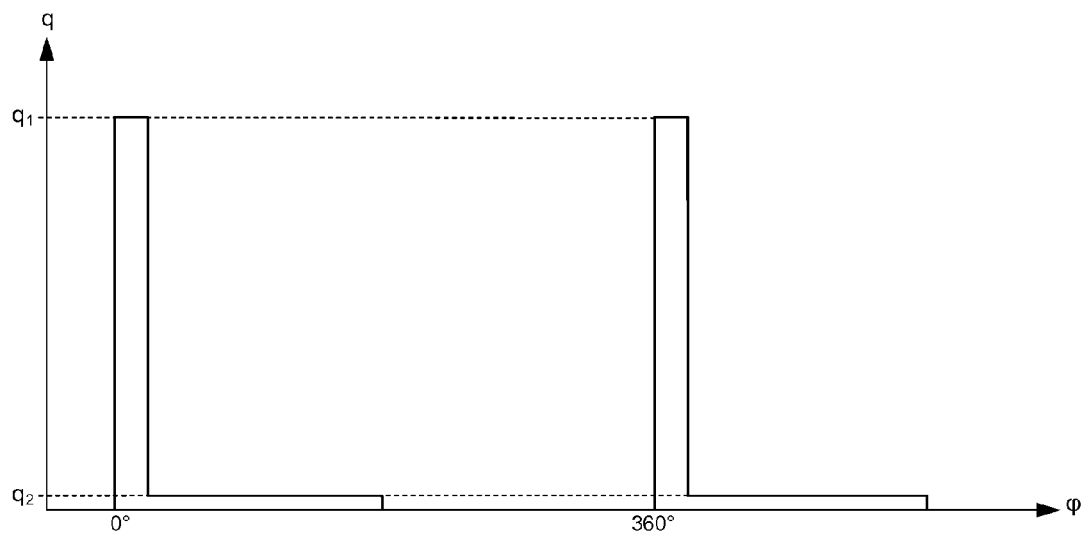
FIG. 6 shows diagrammatically a flow sequence of a pulse-width-regulating valve used as an injector.

"φ", in FIG. 6, indicates an angle of rotation for a crank shaft, valve drive shaft or equivalents thereto.

Figure 15:
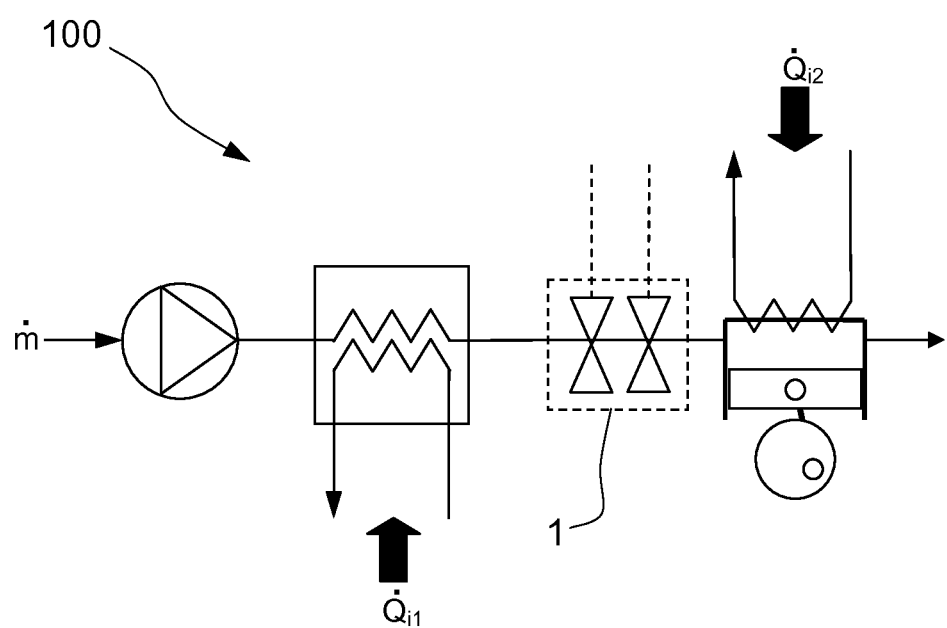
FIG. 15 shows the pulse-width-regulating valve of FIG. 13 used as a working-fluid injector at a thermodynamic engine with an internal heat exchanger, wherein the working fluid may be injected cyclonically into the work chamber of the thermodynamic engine.

"m", in FIG. 15, indicates a specific amount of working fluid, "$Q_{i1}$" indicates the specific supply of thermal energy to the working fluid from an external heat source, and "$Q_{i2}$" indicates the specific supply of thermal energy to the working fluid from an internal heat exchanger in the expansion chamber.

Figure 2:
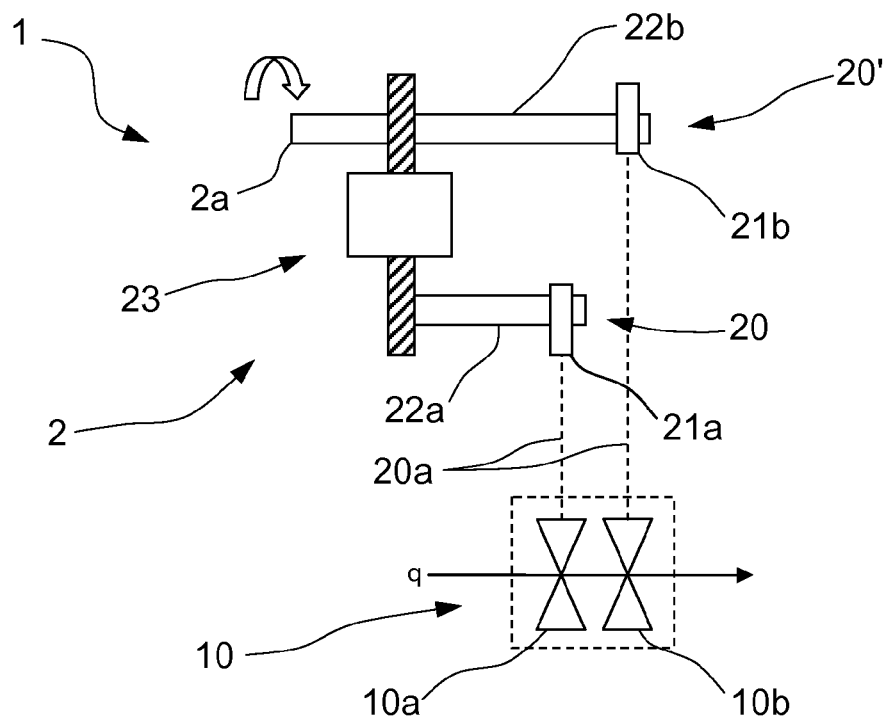
FIG. 2 shows a principle drawing of a pulse-width-regulating valve in which the valve elements are connected to a first embodiment of a valve gear.

Reference is first made to FIG. 2, in which a pulse-width-regulating valve 1 includes a valve unit 10 provided with first and second valve elements 10a, 10b. A valve gear 2 is arranged for the valve unit 10. The first valve element 10a is also called a cut-off valve element as it is it used to cut off the supply of the fluid flow q. The second valve element 10b is also called an inflow valve element as it is used to open to the supply of the fluid flow q to a downstream consumer, for example a heat engine 100 (see FIGS. 10, 11 and 15). The cut-off valve element 10a and the inflow valve element 10b may incidentally be arranged in the opposite order in terms of fluid flow. The valve gear 2 includes first and second valve actuators 20, 20' and is shown here as a double camshaft, a driven valve drive shaft 2a providing synchronized rotation of first and second camshafts 22a, 22b, and a valve synchronizer 23 providing for the valve actuators 20, 20' to work with a desired phase shift. The valve actuators 20, 20' are connected to the valve elements 10a, 10b by means of a valve-actuator connection 20a each, for example a rod.

Figure 3:
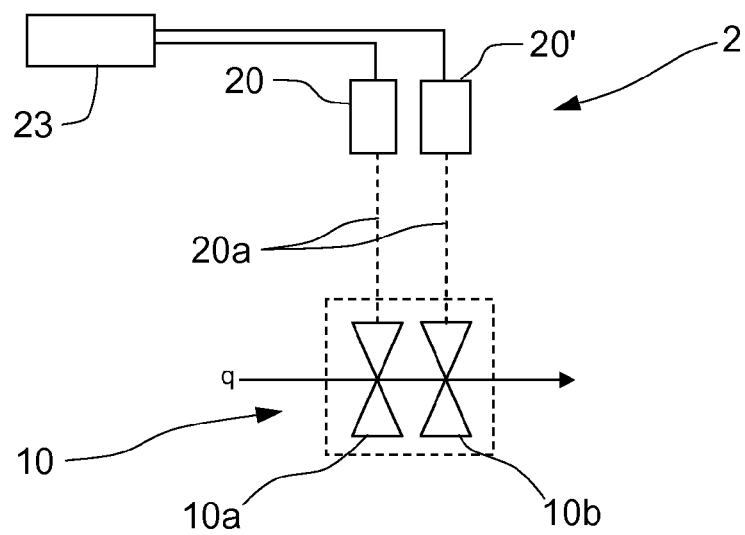
FIG. 3 shows a principle drawing of a pulse-width-regulating valve with a second embodiment of a valve gear.

In FIG. 3, the valve gear 2 is shown with valve actuators 20, 20' in the form of electromechanical, hydraulic or pneumatic actuators synchronized and phase-shifted by means of a valve synchronizer 23. Servos could typically also be used as valve actuators 20, 20'.

Figure 4:
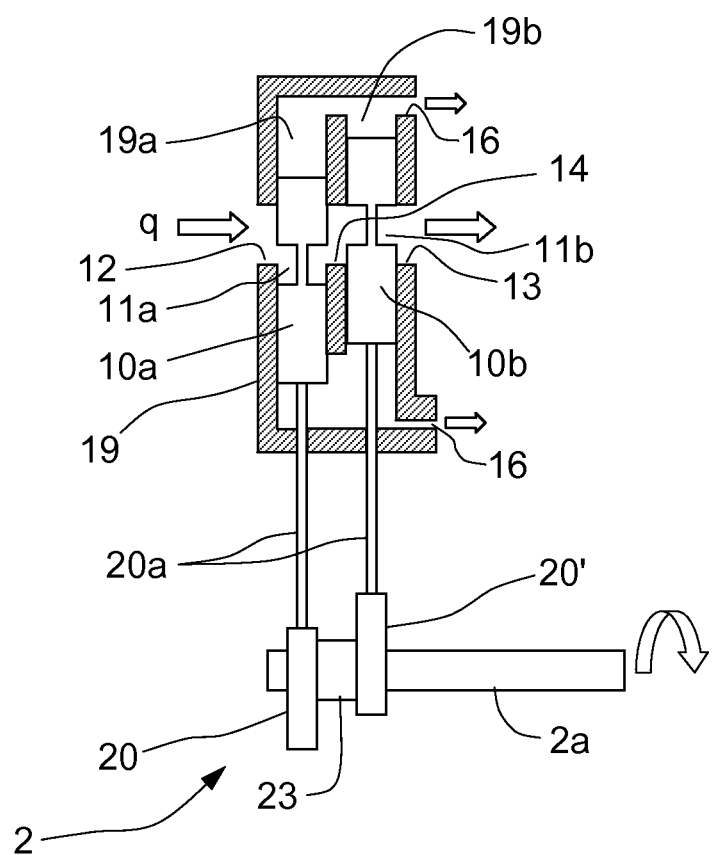
FIG. 4 shows a partially cut away view of a pulse-width-regulating valve based on slide or piston valves.

Reference is now made to FIG. 4, in which a pulse-width-regulating valve 1 is shown in greater detail with two valve elements 10a, 10b of a slide type arranged in, respectively, a first and a second portion 19a of a valve housing 19. The valve elements 10a, 10b are connected to a valve gear 2 as described above. The valve housing 19 includes an inlet port 12 connected to the first valve element 10a, an outlet port 13 connected to the second valve element 10b and an intermediate-passage port 14 forming a connection between the first and the second portion 19a, 19b of the valve housing 19. The inlet, outlet and intermediate-passage ports 12, 13, 14 are closed and opened by the displacement of the valve elements 10a, 10b. The valve elements 10a, 10b are provided with fluid passages 11a and 11b, respectively.

The valve housing 19 is also provided with leak ports 16 to prevent pressure build-up due to unintentional leakage past the valve elements 10a, 10b.

It is worth noting that the outlet port 13 in this embodiment has a large cross section in relation to the fluid passages 11a, 11b of the valve elements 10a, 10b. It is also worth noting that the valve elements 10a, 10b switches between the open and closed positions when exhibiting the highest displacement speed. This reduces the flow losses connected with opening and closing.

FIG. 5 shows the effect of different phase shifts between the valve elements 10a, 10b. A displacement curve 9a for the cut-off valve element 10a is shown in a broken line, and a displacement curve 9b for the inflow valve element 10b is shown in a solid line. A resulting valve-function curve 8 shows the switching of the pulse-width-regulating valve 1 between the open and closed states a and b, respectively. Curves are shown for duty cycles of 35% and 6%.

FIG. 6 shows a resulting valve-function curve 8 for a pulse-width-regulating valve 1, in which the cut-off valve element 10a is provided with a driving-flow channel which provides a driving fluid flow $q_2$ as long as the inflow valve element 10b is in its open position. The driving-flow channel and the effect thereof are described below. As long as both the cut-off valve element 10a and the inflow valve element 10b are open, the valve 1 outputs a main fluid flow $q_1$. Correspondingly, the effect of a driving-fluid channel in the inflow valve element 10b will provide a driving fluid flow $q_2$ which is followed by the main fluid flow $q_1$.

Figure 7:
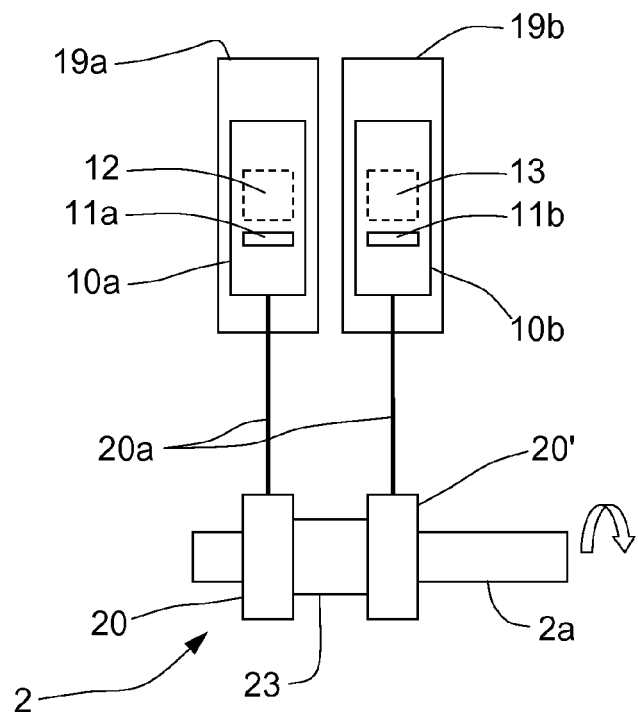
FIG. 7 shows a principle drawing of the mechanical elements of a pulse-width-regulating valve.
Figure 8:
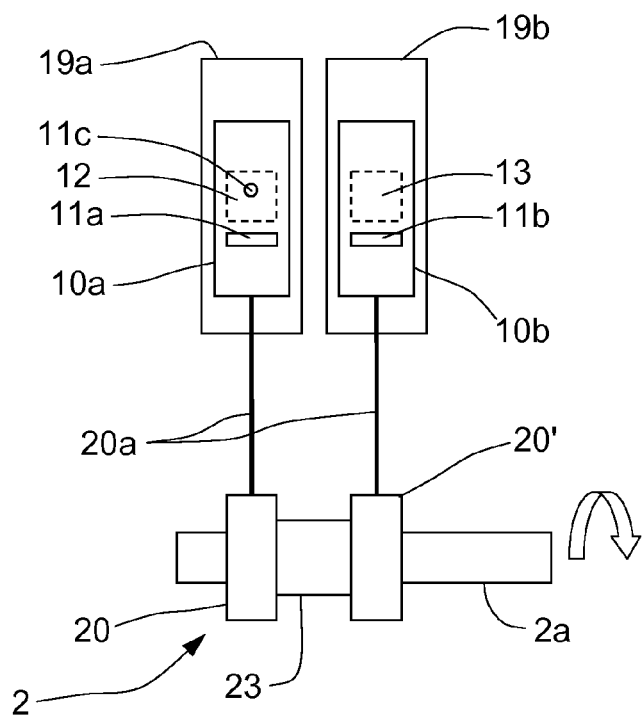
FIG. 8 shows a principle drawing corresponding to the one shown in FIG. 7, but in which one element also has a driving-flow channel.
Figure 13:
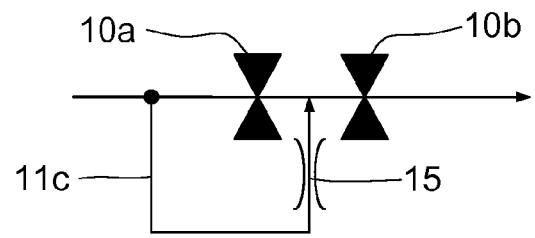
FIG. 13 shows a sketch of the pulse-width-regulating valve with a driving-flow port (leak-flow port)
Figure 14:
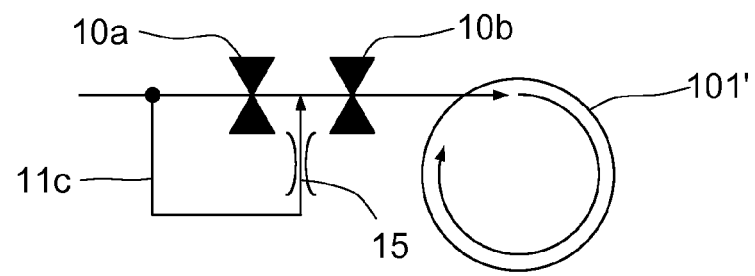
FIG. 14 shows the pulse-width-regulating valve according to FIG. 13 in which a fluid flow is carried into a cyclone.

Reference is now made to FIG. 7, which shows a principle drawing of the pulse-width-regulating valve 1, and to FIG. 8, which shows its equivalent, but in which the cut-off valve element 10a is provided with a driving-flow channel 11c. It may be favourable to provide a certain amount of convection/forced flow in an expansion chamber provided with a heat exchanger. This may be provided by the use of the driving-flow channel 11c which is in fluid communication with said expansion chamber. This principle is also shown schematically in the FIGS. 13 and 14, in which the driving-flow channel 11c includes a driving-flow port 15, which is provided with a throttling. The driving-flow channel 11c may be routed to a fluid receiver, shown schematically as a cyclone 101' in FIG. 14, in many different ways, for example via the inflow valve element 10b or in the material of the valve housing 19. The driving-flow port 11c may be formed in the cut-off valve element 10a itself, as it is indicated in FIG. 8, or as a separate port into an intermediate valve volume (not shown).

FIG. 9 shows the cut-off and inflow valve elements 10a and 10b, respectively, in different positions in the course of two complete duty cycles with corresponding displacement curves 9a, 9b and the valve function curve 8 for a duty cycle of 35%.

Figure 10:
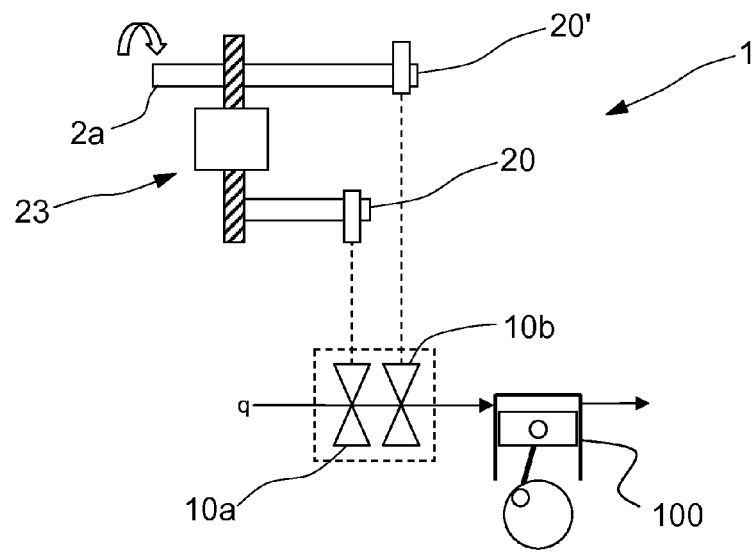
FIG. 10 shows a principle drawing of the pulse-width-regulating valve used for a thermodynamic engine, and more particularly a piston engine.

FIG. 10 shows an exemplary embodiment of a pulse-width-regulating valve 1 arranged for a piston engine 100.

Figure 11:
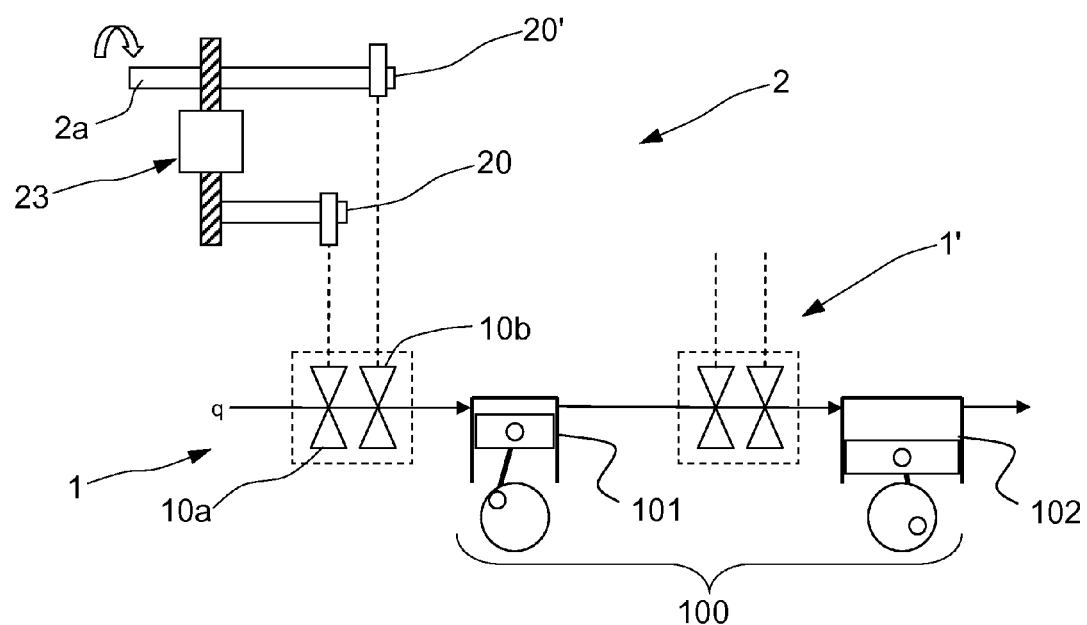
FIG. 11 shows a principle drawing of the pulse-width-regulating valve used for a multiple-expansion engine, and in this case, a compound engine.

FIG. 11 correspondingly shows first and second pulse-width-regulating valves 1, 1' arranged for first and second expansion chambers 101, 102 in a piston engine 100 (multiple-expansion engine).

Figure 12:
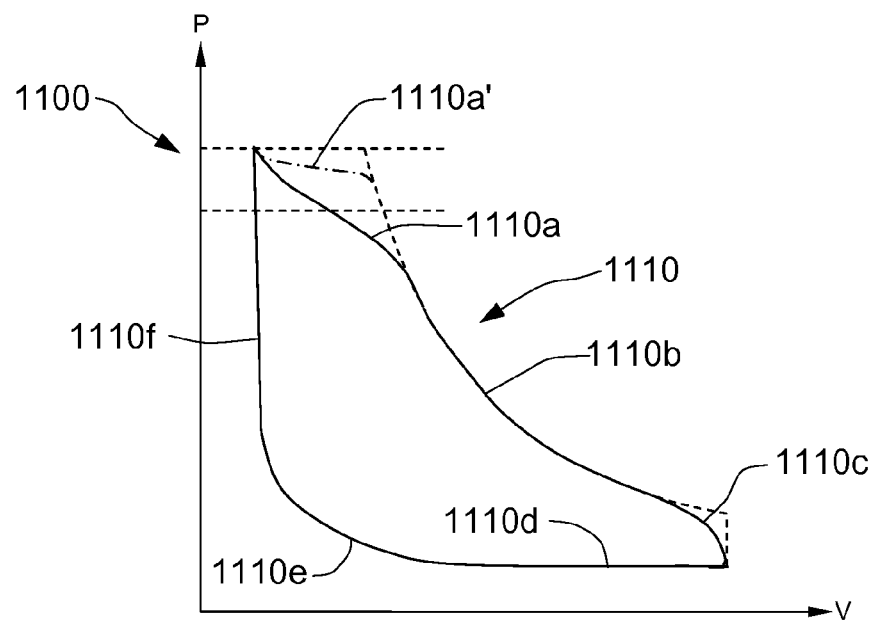
FIG. 12 shows a typical PV diagram for a steam engine or equivalents thereto.

FIG. 12 shows a typical PV diagram 1100 for a steam engine or equivalents thereto, in which 1110 indicates a work stroke, and in which 1110a indicates an inflow course, 1110a' indicates the effect of an improved inflow course which can be achieved by means of the invention, 1110b shows a near-adiabatic expansion course and 1110c indicates the start of outflow (exhaust). Further, 1110d indicates an outflow course, 1110e a pre-compression and 1110f an initial inflow course/preliminary inflow.

FIG. 15 shows how, in principle, a pulse-width-regulating valve 1 is arranged in a working-fluid circuit in a heat engine.

Figure 16A:
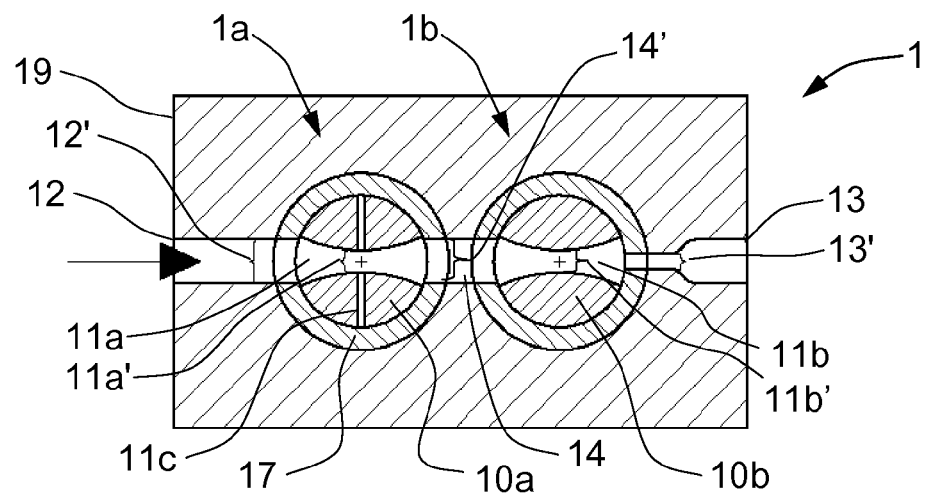
FIG. 16a shows a radial section through a pulse-width-regulating valve implemented with rotatable valve elements.
Figure 16B:
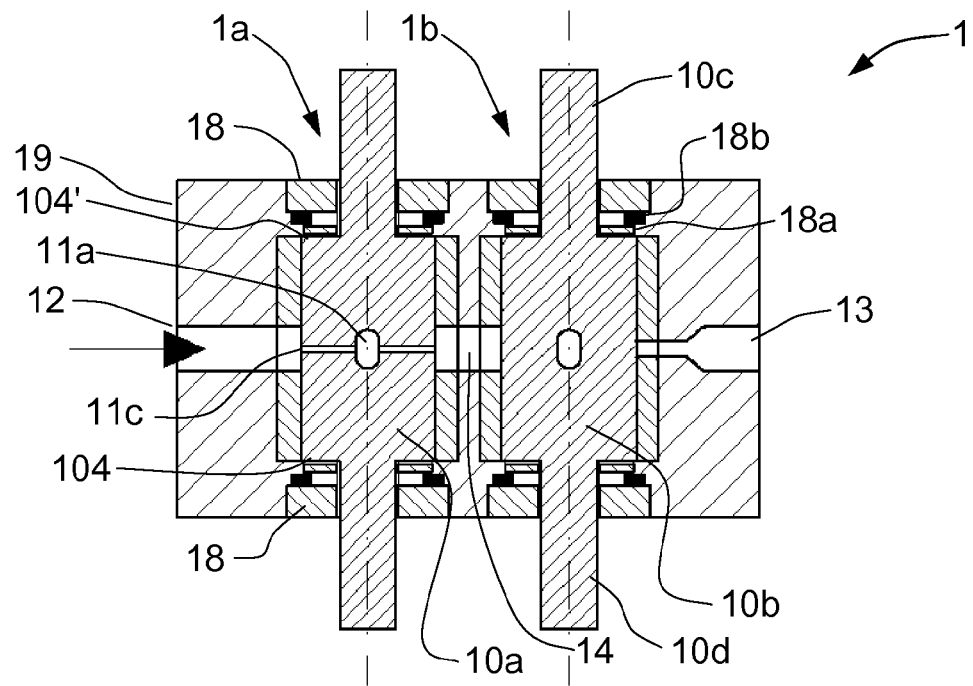

Reference is now made to FIGS. 16a and 16b in which the pulse-width-regulating valve 1 is provided with rotatable valve elements 10a, 10b where the fluid passages 11a and 11b, respectively, extend in a radial direction with apertures 11a' and 11b', respectively, decreasing towards the centre axis of the valve element. The aperture of the inlet port 12 is indicated by the reference numeral 12'. The aperture of the intermediate-passage port 14 is indicated by the reference numeral 14'. The aperture of the outlet port 13 is indicated by the reference numeral 13'.

Figure 17A:
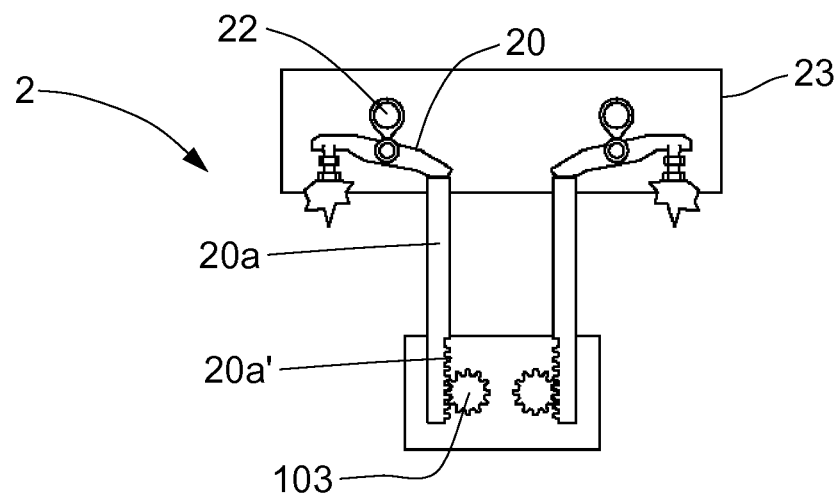
FIGS. 17a and 17b show principle drawings of different embodiments of rotation mechanisms for the rotatable valve elements.
Figure 17B:
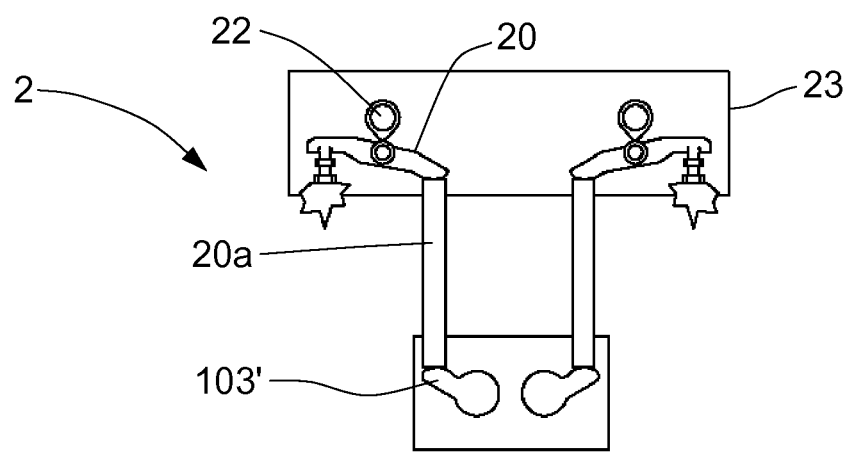

FIGS. 17a and 17b show different principles for converting the oscillating motion of a valve actuator 20 via a valve-actuator connection 20a into a rotary motion of the valve elements 10a, 10b, shown here with a rotating camshaft 22a, 22b of a kind known per se; in a first embodiment (see FIG. 17a), by transmitting the oscillating motion of a push rod 20a via a pitch-rack portion 20a' to a toothed wheel 103 arranged on one valve stem 10c, possibly 10d, of the valve element 10a, 10b, and in a second embodiment (see FIG. 17b), by transmitting the oscillating motion of a push rod 20a to a valve arm 103' arranged on one valve stem 10c, possibly 10d, of the valve element 10a, 10b.

A valve synchronizer 23, which is shown schematically, is arranged for the valve gear 2 in such a way that the rotation of the camshafts 22a, 22b can be phase-shifted.

The symmetry of the valve elements 10a, 10b, that is to say the fact that both ends of the valve elements 10a, 10b form the valve stems 10c, 10d, each projecting through a respective valve seal 18, gives a balanced axial pressure load on the valve elements 10a, 10b, by the very fact of first and second end faces 104, 104' facing the valve seals 18 being equally large. Thereby the frictional forces between the valve element 10a, 10b and the valve seals 18 are reduced. Little power is thereby required to move the valve elements 10a, 10b. The valve 1 will normally be provided with end plates (not shown) that hold the valve seals 18 in place. Also, more than one valve seal 18 may be arranged for each valve stem 10c, 10d, and in that case, it will be natural for the valve 1 to be provided with a corresponding number of extra end plates (not shown).

The switching of the valve elements 10a, 10b between the open and closed positions with an adjustable phase shift, provides a fully variable valve function from a minimum level determined by the "intermediate valve volume" formed by the intermediate-passage port 14, which will constantly be filled with fluid.

Even though, in the above embodiments, rotating valve elements have been described and shown, the described effect will be achieved also by the use of slide valves that exhibit their open positions between their end positions.

The use of valve element bushings 17 in the valve housing 19 may be of vital importance to the function and lifetime of the valve 1, which, for this type of device, should be at least 10 000 hours.

It may be an advantage to use an accumulator (not shown) right in front of the first valve unit 1a, especially in water injection, but it may also be important in gas injection, that is to say when the valve 1 is used in ORC (Organic Rankine Cycle) engines. The accumulator reduces the risk of pressure peaks when liquid is injected, and it reduces the pressure drop during the initial injection. A preferred type of accumulator is a metal-bellows accumulator, which can withstand high temperatures, for example 180° C. or more.

The valve elements 10a, 10b advantageously exhibit a relatively large diameter, typically about 24 mm when the circumferential width of the valve element opening 11a, 11b is about 6 mm. A large diameter entails a greater circumferential speed than a small diameter at a given rotation speed and a high switching speed is thereby achieved when the valve goes from open to closed and vice versa, which is important to avoid large pressure drops and thereby losses in the switching phases. The diameter of the valve stems 10c, 10d, on the other hand, is relatively small, typically about 8-10 mm for a valve element diameter of 24 mm.

The valve element openings 11a, 11b preferably exhibit a small width (that is to say the extent in the moving direction of the valve element 10a, 10b) in relation to its height, for example in the range of 2/10-4/10. In a valve element 10a, 10b of the dimensions mentioned in the preceding paragraph, the width/height ratio is typically about 4/14. This provides faster opening or closing than with a large width.

Even though, in the exemplary embodiment, a valve gear 2 with a camshaft 22 (see FIGS. 17a and 17b) is shown, a fully rotating, mechanical valve gear may also be usable for practical purposes. A fully rotating valve gear has the advantage of being very simple and inexpensive. A valve gear 2 with a camshaft 22, on the other hand, gives the advantage of the speed profile of the valve being manipulatable within certain frames. With a cam gear, great speed can be achieved in the switching phase, that is to say when the valve element 10a, 10b goes from open to closed or vice versa. At the same time, it could be approximately at rest when it has reached the fully open position. This may have a favourable effect on the pressure drop across the valve 1, thereby giving reduced losses. For a fully rotating valve gear it is correspondingly conceivable that the ports 12, 13 of the valve 1 are overdimensioned so that the pressure drop will, in any case, be relatively low, and in that case, a good, but still simple compromise may be achieved.

In liquid injection, a situation will arise in the intermediate valve volume, represented by the intermediate-passage port 14, wherein the inflow valve 1b is closed and the cut-off valve 1a opens and the intermediate valve volume fills with liquid. This could lead to undesired pressure peaks (cavitation). A "soft" opening of the cut-off valve 1a is therefore beneficial, which may be implemented through a cam gear, but correspondingly, the closing of the cut-off valve 1a should be fast to reduce the throttling loss. This combination may be satisfied by means of an adapted cam profile. This effect is difficult to achieve with a fully rotating valve gear with fixed speed.

The elements of the valve 1, that is to say the elements 10a, 10b, the valve element bushings 17 and so on, should have nearly the same temperature as the maximum temperature of the working fluid in order that no power be lost through the injector. This is also favourable in order to reduce the risk of increased friction, possibly seize-up, between moving and static parts. This may be solved by good thermal connection to an existing heat exchanger being established, or possibly by the valve housing 19 being provided with channels for the circulation of a heated thermofluid. The valve housing 19 may possibly be insulated.

The rotatable valve elements 10a, 10b according to the exemplary embodiment shown in FIG. 16b are preloaded in the axial direction to determine the axial position of the valve elements 10a, 10b. Preloading elements 18b, typically in the form of O-rings, are arranged between the valve seal 18 and a slide disc 18a formed out of a high-temperature-resistant plastic material which minimizes the frictional forces that arise between the valve element 10a, 10b and the slide disc 18a in consequence of the preloading.

The pulse-width-regulating valve 1 is in fluid communication with one or more work chambers 101, 102 in a heat engine 100, or more generally a displacement engine, as is shown in the FIGS. 10 and 11 among others. The displacement engine may typically be a piston engine, a scroll engine (spiral engine), a wing engine, a gear engine or a screw engine. For a person skilled in the art, it will be obvious that by a piston engine is meant a hydraulic cylinder as well.

The invention claimed is:

1. A pulse-width-regulating valve configured to regulate at least one of a fluid flow and a fluid pressure, the pulse-width-regulating valve comprising:
    a valve housing comprising an inlet port, an outlet port, and an intermediate-passage port disposed between the inlet port and the outlet port;
    a cut-off valve comprising a first valve element having a first through-going fluid passage, the first valve element being movable into and between an open position in which fluid flow from the inflow port to the intermediate-passage port is allowed via the first through-going fluid passage and a closed position in which fluid flow from the inflow port to the intermediate-passage port is prevented;
    an inflow valve connected in series with the cut-off valve, the inflow valve comprising a second valve element having a second through-going fluid passage, the second valve element being movable into and between an open position in which a fluid flow from the intermediate-passage port to the outlet port is allowed via the second through-going fluid passage and a closed position in which fluid flow from the intermediate-passage port to the outlet port is prevented; and
    wherein the cut-off valve and the inflow valve each comprise a gliding port transition that is configured such that the first valve element and second valve element can be accelerated prior to reaching their respective open and closed positions, thereby enabling opening and closing of the cut-off valve and the inflow valve at a highest possible displacement speed of the respective first and second valve elements,
    the pulse-width-regulating valve further comprising a valve gear device that is configured to move at least one of the cut-off valve and the inflow valve into and between the respective open and closed positions,
    wherein the valve gear device is configured to move the cut-off valve at a first opening speed towards the open position, wherein the valve gear device is configured to move the cut-off valve at a first closing speed towards the closed position, wherein the first opening speed is greater than the first closing speed, and
    wherein the valve gear device is configured to move the inflow valve at a second opening speed towards the open position, wherein the valve gear device is configured to move the inflow valve at a second closing speed towards the closed position, wherein the second closing speed is greater than a second opening speed.

2. A pulse-width-regulating valve configured to regulate at least one of a fluid flow and a fluid pressure, the pulse-width-regulating valve comprising:
    a valve housing comprising an inlet port, an outlet port, and an intermediate-passage port disposed between the inlet port and the outlet port;
    a cut-off valve comprising a first valve element having a first through-going fluid passage, the first valve element being movable into and between an open position in which fluid flow from the inflow port to the intermediate-passage port is allowed via the first through-going fluid passage and a closed position in which fluid flow from the inflow port to the intermediate-passage port is prevented;
    an inflow valve connected in series with the cut-off valve, the inflow valve comprising a second valve element having a second through-going fluid passage, the second valve element being movable into and between an open position in which a fluid flow from the intermediate-passage port to the outlet port is allowed via the second through-going fluid passage and a closed position in which fluid flow from the intermediate-passage port to the outlet port is prevented; and
    wherein the cut-off valve and the inflow valve each comprise a gliding port transition that is configured such that the first valve element and second valve element can be accelerated prior to reaching their respective open and closed positions, thereby enabling opening and closing of the cut-off valve and the inflow valve at a highest possible displacement speed of the respective first and second valve elements,
    the pulse-width-regulating valve further comprising a driving flow channel formed through the first valve element, wherein the driving flow channel is in fluid communication with the second valve element when the first valve element is the closed position.

3. A pulse-width-regulating valve configured to regulate at least one of a fluid flow and a fluid pressure, the pulse-width-regulating valve comprising:

a valve housing comprising an inlet port, an outlet port, and an intermediate-passage port disposed between the inlet port and the outlet port;

a cut-off valve comprising a first valve element having a first through-going fluid passage, the first valve element being movable into and between an open position in which fluid flow from the inflow port to the intermediate-passage port is allowed via the first through-going fluid passage and a closed position in which fluid flow from the inflow port to the intermediate-passage port is prevented;

an inflow valve connected in series with the cut-off valve, the inflow valve comprising a second valve element having a second through-going fluid passage, the second valve element being movable into and between an open position in which a fluid flow from the intermediate-passage port to the outlet port is allowed via the second through-going fluid passage and a closed position in which fluid flow from the intermediate-passage port to the outlet port is prevented; and wherein the cut-off valve and the inflow valve each comprise a gliding port transition that is configured such that the first valve element and second valve element can be accelerated prior to reaching their respective open and closed positions, thereby enabling opening and closing of the cut-off valve and the inflow valve at a highest possible displacement speed of the respective first and second valve elements, wherein the first and second valve elements comprise first and second end faces, respectively, that are perpendicular to respective center axes of the first and second valve elements, and further comprise valve axles that project through respective valve seals in the valve housing.

4. The pulse-width regulating valve according to claim 3, wherein the gliding port transition of the cut-off valve is defined by:

the first valve element of the cut-off valve being further movable into a first starting position in which the fluid flow from the inlet port to the intermediate-passage port is prevented, wherein the open position is located between the first starting position and the closed position, and the first valve element of the cut-off valve being further movable into a second starting position in which the fluid flow from the inlet port to the intermediate-passage port is prevented, wherein the closed position is located between the second starting position and the open position.

5. The pulse-width regulating valve according to claim 3, wherein the gliding port transition of the inflow valve is defined by:

the second valve element of the inflow valve being movable into a first starting position in which the fluid flow from the intermediate-passage port to the outlet port is prevented, wherein the open position is located between the first starting position and the closed position; and the second valve element of the inflow valve being movable into a second starting position in which fluid flow from the intermediate-passage port to the outlet port is prevented, wherein the closed position is located between the second inflow valve staring position and the open position.

6. The pulse-width-regulating valve according to claim 3, wherein at least one of the first and second valve elements is axially displaceable.

7. The pulse-width-regulating valve according to claim 3, wherein at least one of the first and second valve elements is rotatable.

8. The pulse-width-regulating valve according to claim 3, wherein at least one of the inflow valve and the cut-off valve are selected from the group consisting of a shell valve, a slide valve, and a rotating valve.

9. The pulse-width-regulating valve according to claim 3, further comprising a valve gear device that is configured to move at least one of the cut-off valve and the inflow valve into and between the respective open and closed positions.

10. The pulse-width-regulating valve according to claim 9, wherein the valve gear device is configured to move the cut-off valve at a first opening speed towards the open position, wherein the valve gear device is configured to move the cut-off valve at a first closing speed towards the closed position, wherein the first opening speed is greater than the first closing speed, and wherein the valve gear device is configured to move the inflow valve at a second opening speed towards the open position, wherein the valve gear device is configured to move the inflow valve at a second closing speed towards the closed position, wherein the second closing speed is greater than a second opening speed.

11. The pulse-width regulating valve according to claim 9, wherein the valve gear device is configured to accelerate the first and second valve elements in advance of transitional phases during which the first and second valve elements are being moved into or out of the open and closed positions.

12. The pulse-width-regulating valve according to claim 9, wherein the valve gear device comprises at least one actuator selected from the group consisting of a mechanical valve actuator, a hydraulic valve actuator, a pneumatic valve actuator, an electromechanical valve actuator, an electrohydraulic valve actuator, and an electro-pneumatic valve actuator.

13. The pulse-width-regulating valve according to claim 9, further comprising a valve synchronizer that is operably connected to the valve gear device.

14. The pulse-width-regulating valve according to claim 13, wherein the valve synchronizer is configured to adjust an operational phase relationship between opening and closing movements of the inflow and cut-off valves.

15. The pulse-width-regulating valve according to claim 3, wherein the valve housing comprises at least one leak port.

16. The pulse-width-regulating valve according to claim 3, wherein at least one of the first and second valve elements has an aperture, wherein at least one of the inlet port, the outlet port and the intermediate-passage port has an aperture that is sized differently than the aperture of the at least one of the first and second valve elements so as to achieve a valve opening over an extended area of the at least one of the first and second valve elements.

17. The pulse-width-regulating valve according to claim 3, further comprising a driving flow channel formed through the first valve element, wherein the driving flow channel is in fluid communication with the second valve element when the first valve element is the closed position.

18. The pulse-width-regulating valve according to 3, wherein the first and second end faces define axial-pressure faces having equal dimensions.

19. A pulse-width-regulating valve configured to regulate at least one of a fluid flow and a fluid pressure, the pulse-width-regulating valve comprising:

a valve housing comprising an inlet port, an outlet port, and an intermediate-passage port disposed between the inlet port and the outlet port;

a cut-off valve comprising a first valve element having a first through-going fluid passage, the first valve element being movable into and between an open position in which fluid flow from the inflow port to the intermediate-passage port is allowed via the first through-going fluid passage and a closed position in which fluid flow from the inflow port to the intermediate-passage port is prevented;

an inflow valve connected in series with the cut-off valve, the inflow valve comprising a second valve element having a second through-going fluid passage, the second valve element being movable into and between an open position in which a fluid flow from the intermediate-passage port to the outlet port is allowed via the second through-going fluid passage and a closed position in which fluid flow from the intermediate-passage port to the outlet port is prevented; and wherein the cut-off valve and the inflow valve each comprise a gliding port transition that is configured such that the first valve element and second valve element can be accelerated prior to reaching their respective open and closed positions, thereby enabling opening and closing of the cut-off valve and the inflow valve at a highest possible displacement speed of the respective first and second valve elements, wherein the first and second valve elements comprise first and second end faces, respectively, that are perpendicular to respective center axes of the first and second valve elements, and further comprise valve axles that project through respective valve seals in the valve housing, and wherein the first and second end faces define axial-pressure faces having equal dimensions.

20. A pulse-width-regulating valve configured to regulate at least one of a fluid flow and a fluid pressure, the pulse-width-regulating valve comprising:

a valve housing comprising an inlet port, an outlet port, and an intermediate-passage port disposed between the inlet port and the outlet port;

a cut-off valve comprising a first valve element having a first through-going fluid passage, the first valve element being movable into and between an open position in which fluid flow from the inflow port to the intermediate-passage port is allowed via the first through-going fluid passage and a closed position in which fluid flow from the inflow port to the intermediate-passage port is prevented;

an inflow valve connected in series with the cut-off valve, the inflow valve comprising a second valve element having a second through-going fluid passage, the second valve element being movable into and between an open position in which a fluid flow from the intermediate-passage port to the outlet port is allowed via the second through-going fluid passage and a closed position in which fluid flow from the intermediate-passage port to the outlet port is prevented; and wherein the cut-off valve and the inflow valve each comprise a gliding port transition that is configured such that the first valve element and second valve element can be accelerated prior to reaching their respective open and closed positions, thereby enabling opening and closing of the cut-off valve and the inflow valve at a highest possible displacement speed of the respective first and second valve elements;

wherein the first and second valve elements comprise first and second end faces, respectively, that are perpendicular to respective center axes of the first and second valve elements, and further comprise valve axles that project through respective valve seals in the valve housing, and the pulse-width-regulating valve further comprising a preloading element that axially preloads the first and second valve elements so as to provide a compressive force against the first and second end faces.

* * * * *